(12) United States Patent
Casteel

(10) Patent No.: US 6,814,560 B2
(45) Date of Patent: Nov. 9, 2004

(54) QUICK MOLD CHANGE CLAMPING PLATE AND SUPPORT BRACKETS

(75) Inventor: Donald E. Casteel, Athens, TN (US)

(73) Assignee: Textron Automotive Company Inc., Troy, MI (US)

( * ) Notice: Subject to any disclaimer, the term of this patent is extended or adjusted under 35 U.S.C. 154(b) by 0 days.

(21) Appl. No.: 10/311,199

(22) PCT Filed: Jun. 15, 2001

(86) PCT No.: PCT/US01/19122
§ 371 (c)(1),
(2), (4) Date: Sep. 19, 2003

(87) PCT Pub. No.: WO01/96081
PCT Pub. Date: Dec. 20, 2001

(65) Prior Publication Data
US 2004/0052887 A1 Mar. 18, 2004

Related U.S. Application Data
(60) Provisional application No. 60/211,854, filed on Jun. 15, 2000.

(51) Int. Cl.[7] ............................................. B29C 33/30
(52) U.S. Cl. ................................ 425/192 R; 29/426.1; 29/466; 425/195
(58) Field of Search ............................ 425/190, 192 R, 425/195; 29/426.1, 464, 465, 466, 469

(56) References Cited

U.S. PATENT DOCUMENTS

| | | | |
|---|---|---|---|
| 4,348,165 A | 9/1982 | Vostrovsky | 425/185 |
| 4,472,127 A | 9/1984 | Cyriax et al. | 425/183 |
| 4,500,274 A | 2/1985 | Cyriax et al. | 425/185 |
| 4,500,275 A | 2/1985 | Ruhl | 425/192 R |
| 4,568,263 A | 2/1986 | Ruhl | 425/185 |
| 4,702,685 A | 10/1987 | Fruntzek | 425/182 |
| 4,714,421 A | 12/1987 | D'Agostino | 425/192 R |
| 4,929,166 A | 5/1990 | DiSimone et al. | 425/190 |
| 5,012,568 A | 5/1991 | DiSimone et al. | 29/402.08 |
| 5,096,404 A | 3/1992 | Janos et al. | 425/190 |
| 5,308,234 A | 5/1994 | Nicke et al. | 425/188 |
| 5,350,289 A | 9/1994 | Martin | 425/190 |
| 5,562,935 A | 10/1996 | Martin | 425/552 |

Primary Examiner—James P. Mackey
(74) Attorney, Agent, or Firm—Grossman, Tucker, Perreault & Pfleger, PLLC

(57) ABSTRACT

An apparatus for supporting a mold (100) in a press comprising a clamping plate (114, 116) comprising a wedge (172–175) and a support bracket (142–145) comprising a wedge receptacle. The wedge and the wedge receptacle act to direct the mold towards the face and vertical center f a press platen (122, 124).

11 Claims, 8 Drawing Sheets

QUICK MOLD CHANGE CLAMPING PLATE AND SUPPORT BRACKETS

CROSS REFERENCE TO RELATED APPLICATIONS

This application is a U.S. national stage completion of International Application No. PCT/US01/09122 filed Jun. 15, 2001, and published Dec. 20, 2001 as International Publication No. WO 01/96081, designating the United States, and which claims benefit of U.S. Provisional Application No. 60/211,854 filed Jun. 15, 2000.

Injection-molding of plastic materials offers a relatively quick cycle time as compared to other plastic forming techniques such that the machine can often finish a run of a particular molded part in a comparatively short period of time. In order to change from molding one part to another, the mold base for the first part must be removed from the machine and a new mold base for the subsequent part installed. In view of the substantial cost of the machine, it cannot be allowed to sit idle. The time taken in changing the mold base must be kept to a minimum if the machine is to function productively. Currently, it takes from one to several hours to complete a mold base change.

In order to reduce the time required for the mold change process, attempts have been made to equip the platens of molding machines with an array of clamps and guides for supporting the mold base. For example, U.S. Pat. No. 4,500,274 issued to Cyriax et al discloses a quick-change mold assembly employing a plurality of spaced hydraulic clamps mounted on each platen of the press. Spaced guides are provided for receiving a plate attached to the back of a mold half. The clamps and guides are fastened directly to the platens. In order to add these parts to an existing machine, the press has to be disassembled so that the face of the platen can be drilled and tapped. There is no convenient way for machining the platen in the machine. After the platen is prepared, the clamps and guides are attached and the platen is reinstalled in the machine. This clearly involves a great expense which is limited to the particular machine. If the machine breaks or is down for service, the clamps and guides are not readily transferable to another machine.

FIG. 1 is a perspective view of a mold assembly 10 of the prior art secured to platens 22, 24 of an injection-molding machine. To attach the mold assembly 10 to the platens 22, 24, the mold assembly 10 is first lowered in between a stationary platen 22 and a moveable platen 24 by a hook 20 coupled to a crane or forklift (not shown). A crane or forklift is often required to lift the mold assembly 10 due to the weight of the mold assembly. An eyelet 18 secured to the mold assembly 10 provides a means to couple the mold assembly 10 to the crane or forklift. During the molding process, the movable platen 24 travels in a horizontal motion relative to the stationary platen 22 to open and close the mold assembly 10. Opening 28 on stationary platen 22 is sized to fit a locating ring (not shown). Tie bars 40 help to maintain proper alignment of the mold base halves.

The mold assembly 10 comprises a mold base 12 having two halves. The first and second halves of the mold base are separable along a parting line 26. The first mold base half includes a first mold clamping plate 14 secured thereto while the second mold base half includes a second mold clamping plate 16 secured thereto.

Clamping plate 14 is used to secure the first half of the mold base 12 to the moveable platen 24 and clamping plate 16 is used to secure the second half of the mold base 12 to the stationary platen 22. The clamping plates 14 and 16 are secured to platens 24 and 22 respectively using a plurality of clamps 30 and bolts 32.

FIG. 2 shows the plurality of clamps 30 and bolts 32 positioned at different angles around the periphery of the clamping plate 14. The installer installs the clamps 30 around the periphery of clamping plate 14 and tightens them in place using the bolts 32. Generally, the installer may use his or her own discretion and experience to determine the quantity and location of the clamps 30. This secures the clamping plate 14 to moveable platen 24. The installer secures clamping plate 16 to stationary platen 22 in similar fashion.

The clamp 30 is shown as having a generally rectangular shape with a slot formed in the clamp 30 to allow a bolt 32 to extend therethrough. As shown in FIG. 2A, the clamp 30 has a riser portion 30A that spaces clamp 30 approximately the thickness of clamping plate 14. The clamp 30 can be tightened in place by a bolt 32, such as a cap screw, to hold the clamp 30 and clamping plate 14 to the platen 24.

After the mold assembly 10 is secured to the platens 22 and 24, the hook 20 suspending the mold assembly 10 can be disconnected. The installer then connects the water lines and any necessary electrical connections.

The set-up time required to secure the mold assembly 10 to the platens 22 and 24 may be one to four hours. When this mold assembly is removed, it will take another one to four hours to install the next mold. This type of attachment method does not reduce the set-up time required for subsequent mold assembly insertions. This set-up time is costly in terms of machine utilization and the labor required.

Thus, an apparatus for solving the aforementioned problems is desired. These and other objects and advantages of the present invention will become more apparent from the following description and drawings in which like reference numerals depict like elements.

Figure 4:
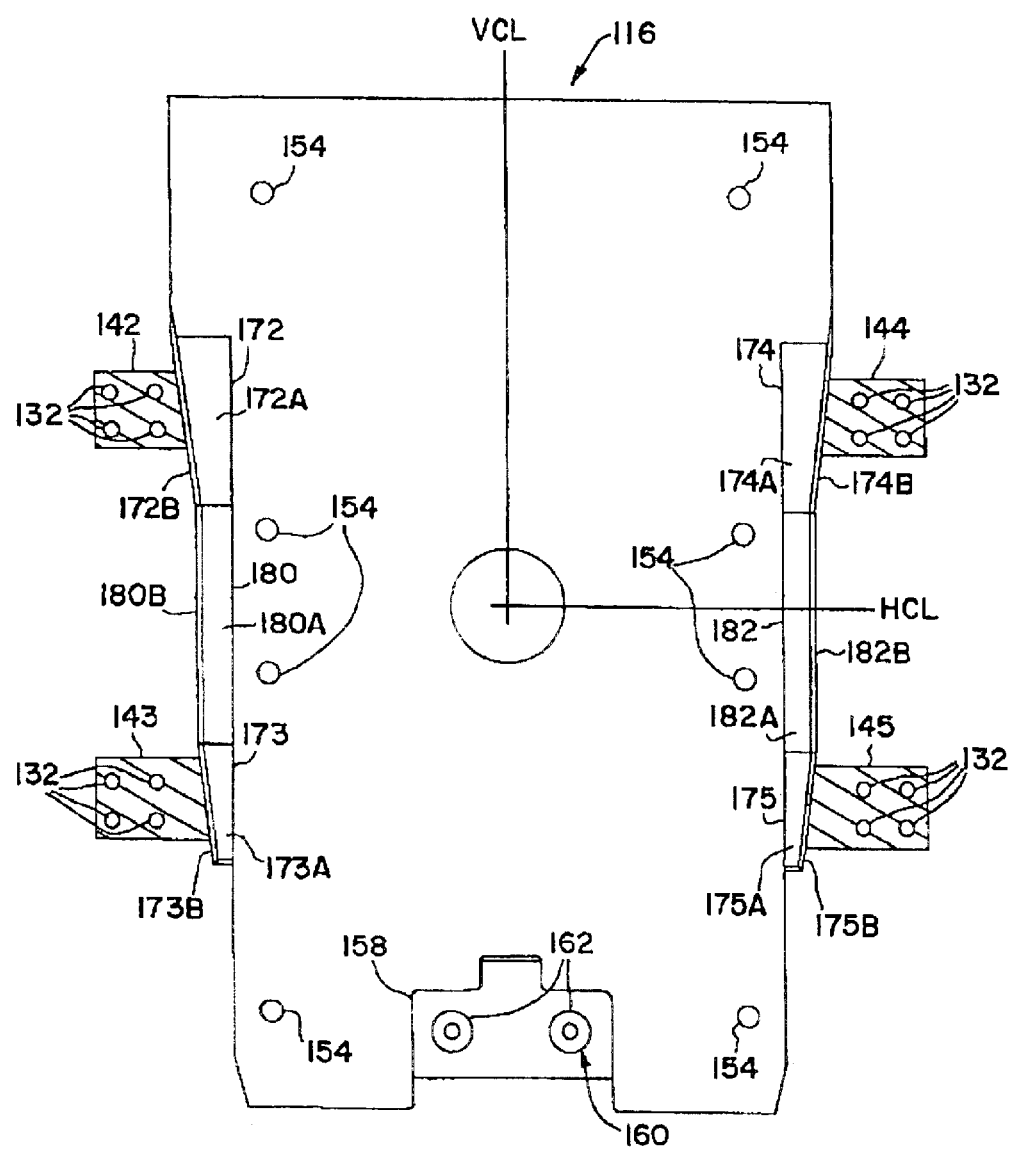
FIG. 4 is a view taken through section lines 4—4 of FIG. 3.
Figure 7A:
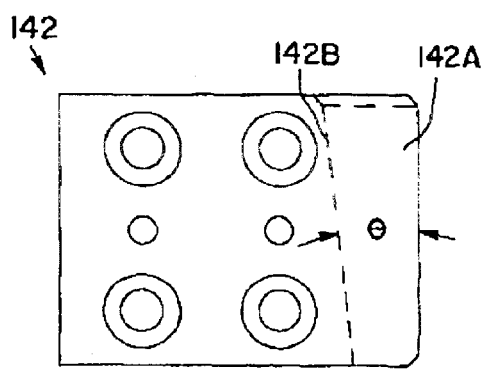
Figure 7B:
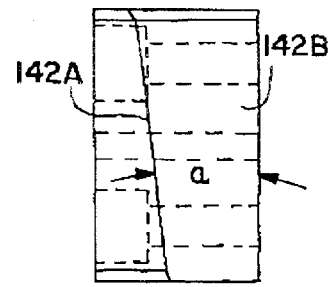
Figure 7C:
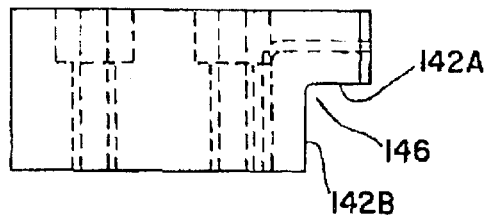

FIGS. 7A, 7B, and 7C are front, side and bottom views respectively of the upper left support bracket of FIG. 4.

Figure 8A:
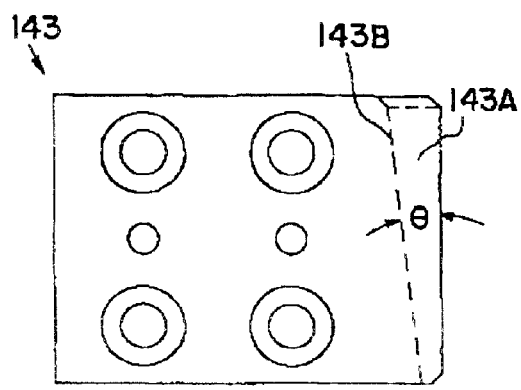
Figure 8B:
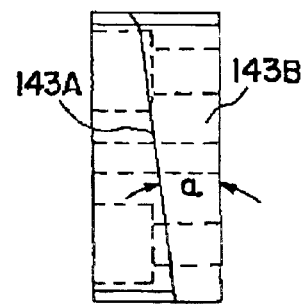
Figure 8C:
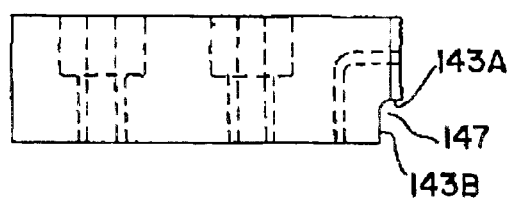

FIGS. 8A, 8B, and 8C are front, side and bottom views respectively of the lower left support bracket of FIG. 4.

The above and other objects, feature, and advantages of the present invention will be apparent in the following detailed description thereof when read in conjunction with the appended drawings wherein the same reference numerals denote the same or similar parts throughout the several views.

Figure 1:
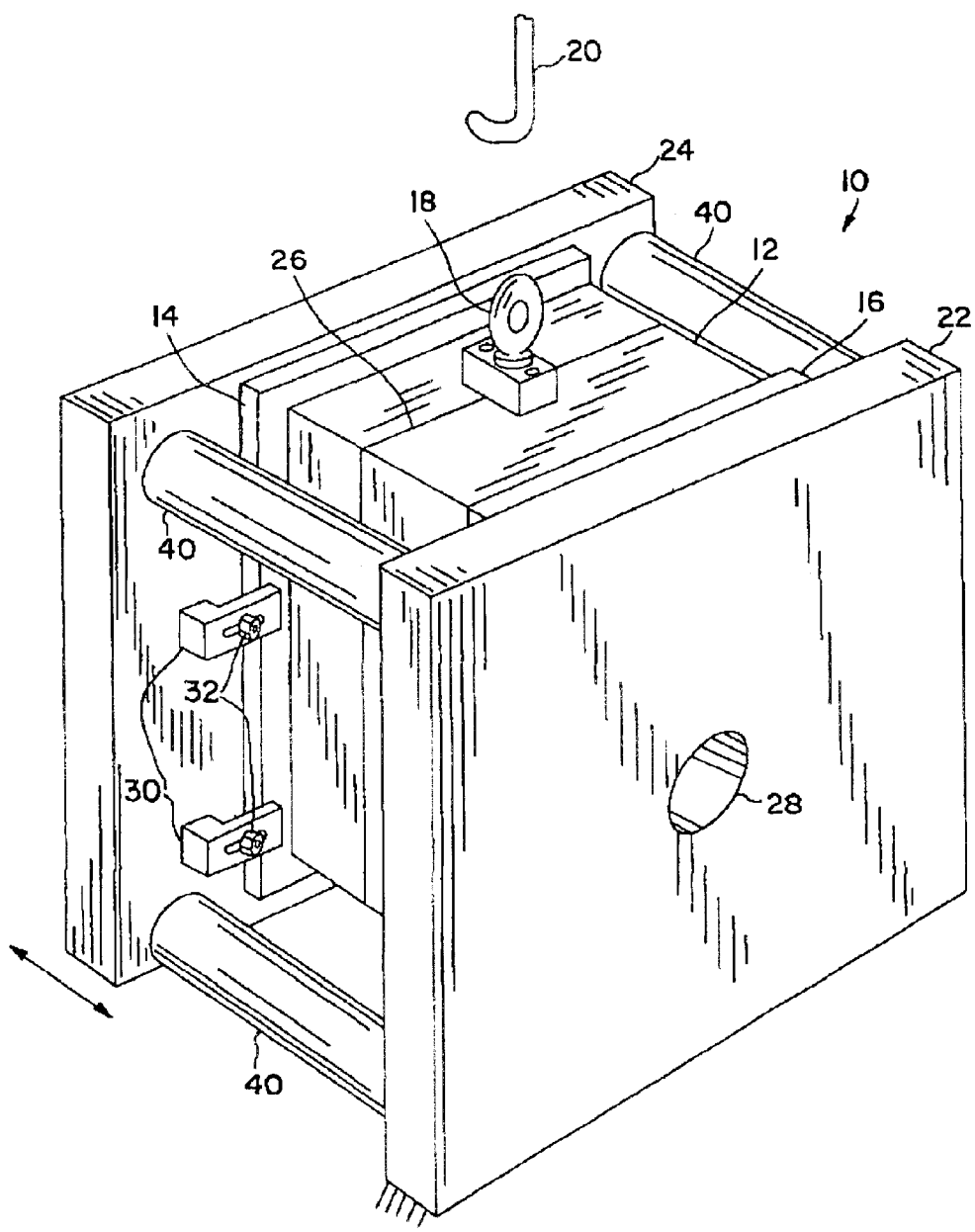
FIG. 1 is a perspective view showing a mold base secured to platens of an injection-molding machine according to the prior art.
Figure 2:
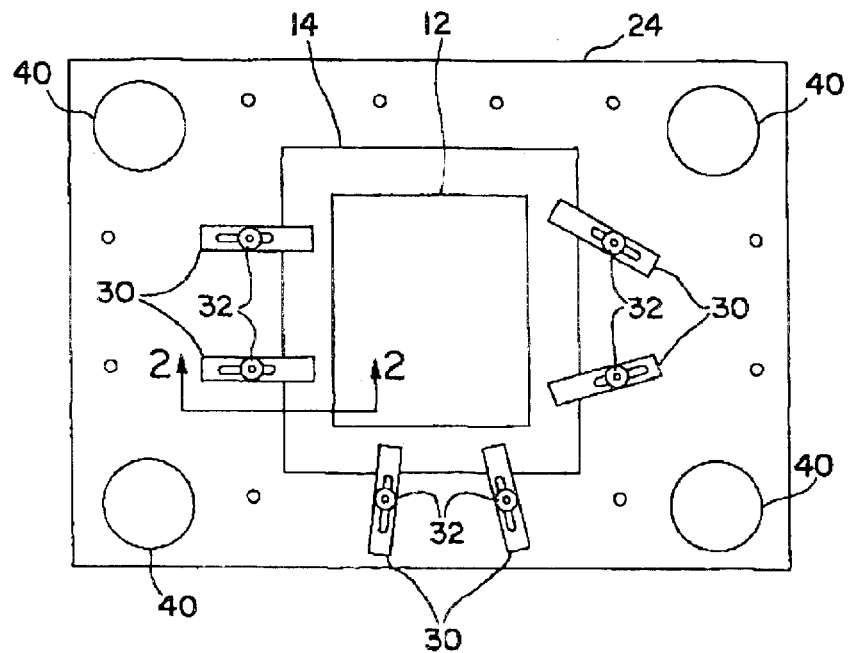
FIG. 2 is a front view of a mold base secured to a platen of an injection-molding machine according to the prior art.
Figure 2A:
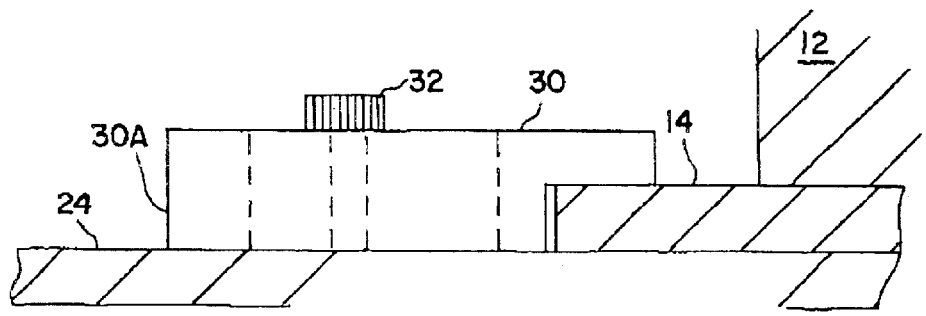
FIG. 2A is a side view of a clamp of FIG. 2 taken through Section line 2—2.
Figure 3:
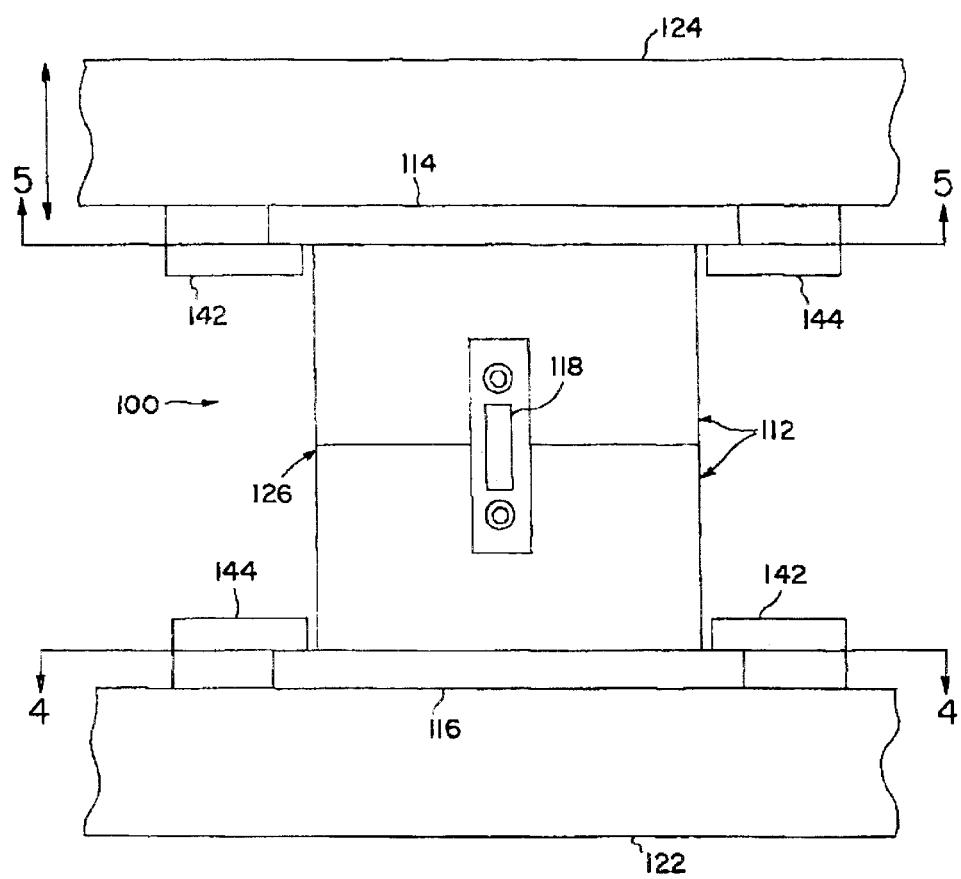
FIG. 3 is a partial view of a mold base according to the present invention secured in an injection-molding machine.

Referring to FIG. 3, there is illustrated a mold assembly 100 secured to the face of platens 122, 124 of an injection-molding machine in accordance with the present invention.

The mold assembly 100 comprises a mold base 112 having two halves. The first and second halves of the mold base 112 are separable along a parting line 126. The first mold base half includes a first mold clamping plate 114 secured thereto while the second mold base half includes a second mold clamping plate 116 secured thereto. The first half of the mold base 112 is secured to the clamping plate 114 using screws (not shown) from the backside of the clamping plate 114 and the second half of the mold base 112 is secured to the clamping plate 116 using screws (not shown) from the backside of the clamping plate 116. The clamping plates 114, 116 are preferably made from mild steel. As shown, clamping plates 114, 116 are intended for use with a 400-ton injection-molding machine, but can be sized for other tonnage machines.

Figure 5:
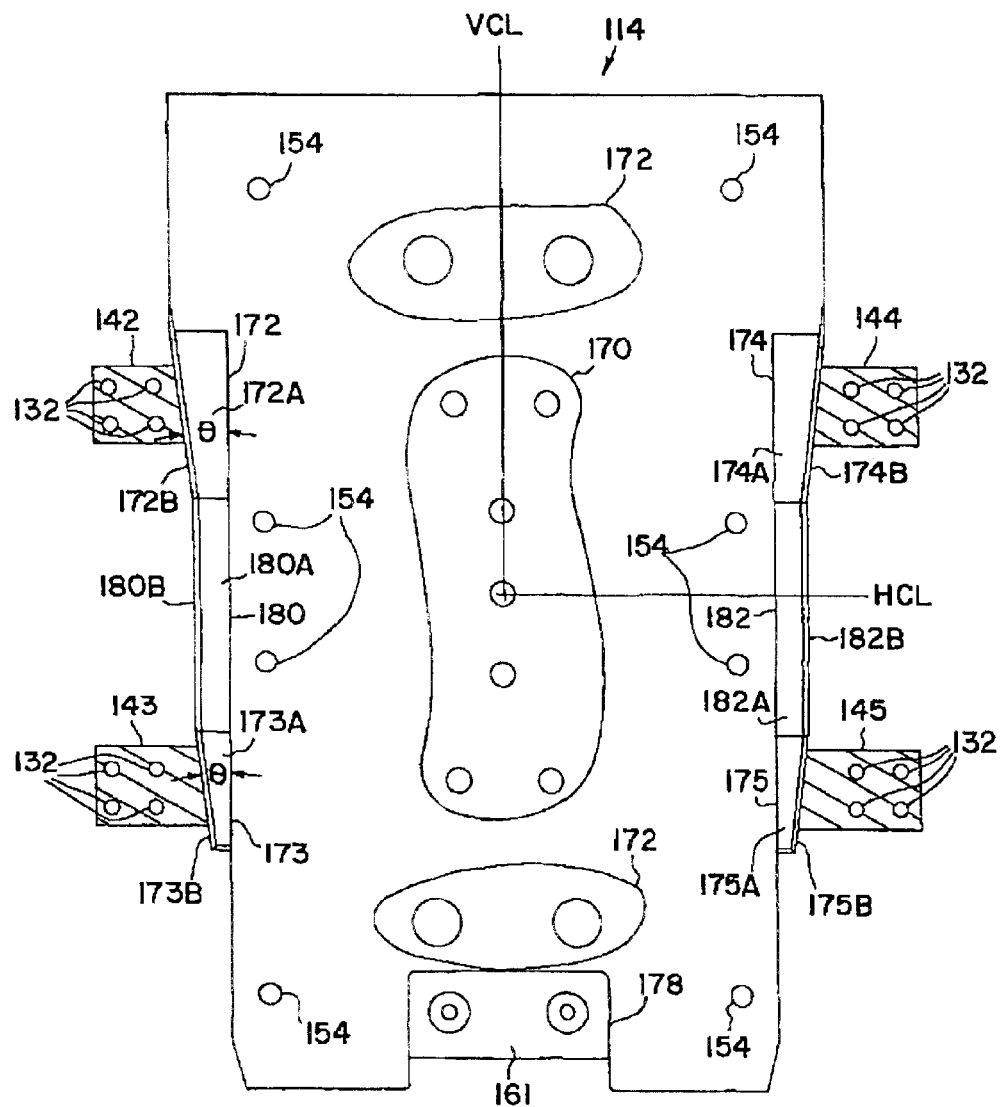
FIG. 5 is a view taken through section lines 5—5 of FIG. 3.

Clamping plate 114 is used to secure the first half of the mold base 112 to the moveable platen 124 and clamping plate 116 is used to secure the second half of the mold base 112 to the stationary platen 122. The clamping plates 114, 116 are secured to platens 124, 122 respectively using a plurality of support brackets 142, 143, 144, and 145 and bolts 132 as shown in FIGS. 4 and 5. The two halves of the mold base are forced together and apart by the movement of the moveable platen 124 relative to the stationary platen 122.

FIGS. 4 and 5 show upper and lower left-hand support brackets 142, 143 and upper and lower right-hand support brackets 144, 145 located on the sides of the clamping plates 114, 116. The support brackets 142, 143, 144, and 145 are preferably made from 4140 steel hardened and drawn to 48-52 Rockwell C. Additional details concerning the support brackets 142, 143, 144, and 145 are disclosed below.

Support brackets 142, 143, 144, and 145 may be installed around the periphery of clamping plate 116 as shown, and tightened in place in traditional fashion using the bolts 132 while a crane or forklift (if required) suspends the mold assembly 100 by eyelet 118. In this manner the bolts 132 are threaded into holes on the stationary platen 122 and torqued to an appropriate value. The support brackets 142, 143, 144, and 145 and bolts 132 secure the clamping plate 116 to stationary platen 122. A vertical stop 160 may be used to support the mold assembly 100 and center it on the stationary platen 122 during and after the installation of the support brackets 142, 143, 144, and 145 and the bolts 132. Clamping plate 114 may be secured to moveable platen 124 in similar fashion. Alternatively, the support brackets 142, 143, 144, and 145 may be attached to the platens 122, 124 via a dimensional layout without any aid of mold assembly 100 for proper location. Of these two alternatives, the second generally much more efficient.

The clamping plate 116 has a plurality of thru holes 154 which are used to secure the second half of the mold base to the clamping plate 116 with bolts (not shown) inserted from the rear side of the clamping plate 116. Likewise a similar series of bolt holes is provided in clamping plate 114 to secure the first half of the mold base 112 to the clamping plate 114.

As shown in the FIGS. 4 and 5, located along the left-hand vertical sides of the clamping plates 114, 116 are a pair of vertically displaced double wedges 172, 173. Correspondingly, located along the right-hand vertical sides of the clamping plates 114, 116 are a second pair of vertically displaced double wedges 174, 175. As shown, double wedges 172, 173 are horizontally displaced from the second pair of double wedges 174, 175.

Figure 5A:
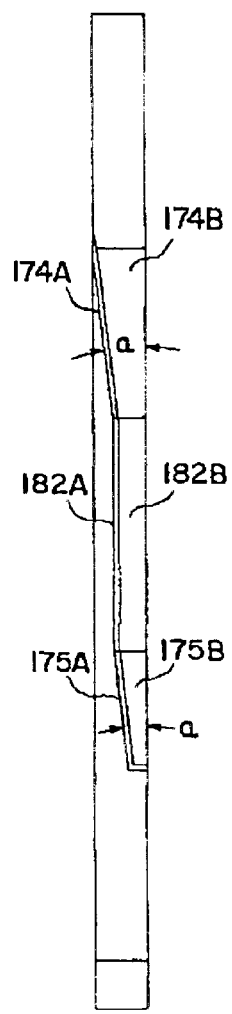
FIG. 5A is a right side view of the clamping plate of FIG. 5.

A double wedge is a wedge comprising two wedge ramp surfaces. As illustrated in FIGS. 4–5A, double wedge 172 comprises wedge ramp surfaces 172A and 172B, double wedge 173 comprises wedge ramp surfaces 173A and 173B, double wedge 174 comprises wedge ramp surfaces 174A and 174B, and double wedge 175 comprises wedge ramp surfaces 175A and 175B.

Two planes that form an acute angle form the wedge ramp surfaces 172A, 172B, 173A, 173B, 174A, 174B, 175A, and 175B. Wedge ramp surfaces 172A, 173A, 174A, and 175A comprise an incline surface defined by an acute angle alpha $\alpha$ relative to the front or rear surfaces of the clamping plates 114, 116. Wedge ramp surface 172B, 173B, 174B, and 175B comprises an incline plane defined by an acute angle theta $\theta$ relative to the vertical center line VCL of the clamping plates 114, 116 or any parallel line thereto. As shown in FIGS. 4–5A, preferably each pair of wedge ramp surfaces 172A, 172B; 173A, 173B; 174A, 174B; and 175A, 175B are adjacent and orthogonal to one another. Furthermore, it is preferred that each pair of wedge ramp surfaces 172A, 172B; 173A, 173B; 174A, 174B; and 175A, 175B are joined by a shared side along their lengths.

Preferably, double wedges 172, 173 are linked, for example by a step 180. More particularly, wedge ramp surfaces 172A, 172B are linked to wedge ramp surfaces 173A, 173B by step surfaces 180A, 180B, respectively. Similarly, double wedges 174, 175 are also linked by a step 182. More particularly, wedge ramp surfaces 174A, 174B are linked to wedge ramp surfaces 175A, 175B by step surfaces 182A, 182B, respectively.

As shown in FIGS. 4–5A, the length of step 180 preferably extends from the beginning and ending of double wedges 172, 173. More particularly, the length of step surfaces 180A, 180B preferably extends from the beginning of wedge ramp surfaces 172A, 172B and the ending of wedge ramp surfaces 173A, 173B, respectively. Similarly, the length of step 182 is preferably extends from the beginning and ending of double 174, 175. More particularly, the length of step surfaces 182A, 182B preferably extends from the beginning of wedge ramp surface 174A, 174B and the ending of wedge ramp surfaces 175A, 175B, respectively.

As best illustrated and understood from FIG. 5A, it can be seen that right-hand double wedges 174, 175 and the corresponding left-hand double wedges 172, 173 (not shown) preferably form two double inclines. With respect to the left-hand double wedges 172, 173, wedge ramp surfaces 172A, 173A form a first double incline, and wedge ramp surfaces 172B, 173B form a second double incline. Similarly, with respect to the right-hand double wedges 174, 175, wedge ramp surfaces 174A, 175A form a first double incline, and wedge ramp surfaces 174B, 175B form a second double incline. As used herein, a "double incline" is created by two different planes.

The wedges ramp surfaces 172A, 172B, 173A, 173B, 174A, 174B, 175A, and 175B that form double wedges 172, 173, 174, and 175 respectively are preferably machined into the clamping plates 114, 116. Wedge ramp surfaces 172A, 173A, 174A, and 175A are preferably defined by an acute angle alpha $\alpha$ of approximately seven degrees (7°) relative to the rear surface of the clamping plates 114, 116 with the thicker portion of the wedges towards the top or upper portion of the clamping plates 114, 116. Wedge ramp surfaces 172B, 173B, 174B, and 175B are preferably defined by an acute angle theta $\theta$ approximately seven degrees (7°) relative to the vertical centerline VCL of the clamping plates 114, 116 with the thicker portion also towards the top or upper portion of the clamping plates 114, 116. The individual wedge ramp surfaces 172A, 172B, 173A, 173B, 174A, 174B, 175A, and 175B that form double wedges 172, 173, 174, and 175 respective do not have to be formed adjacent each other, they can be spaced without departing from the present invention.

Pocketed wear pads made (e.g. from LAMINA) may be installed on the wedges ramp surfaces 172A, 172B, 173A, 173B, 174A, 174B, 175A, and 175B to reduce wear on the clamping plates 114, 116 as they are inserted and removed from the platens 122, 124 and correspondingly into and out of contact with engagement surfaces of support brackets 142, 143, 144, and 145.

Preferably clamping plate 114 has the same outside dimension and double wedge dimensions of clamping plate 116. However, the outside dimensions and/or the double wedges may differ between the clamping plates 114, 116.

Clamping plate 116 has a long opening 156 in the center of the clamping plate to hold a locating ring (not shown). The clamping plate 116 further has a cut out 158 at the base of the clamping plate 116 to help center the clamping plate 116 during installation and provides a positive stopping mechanism. The cut out 158 is shown having an inverted "T" shape, but other shapes such as triangular and circular are conceivable. The upper portion of the cut out 158 is sized to be slightly larger than the upstanding portion 166 of the vertical stop 160 to be described below. The cut out 158 also has chamfers or lead-ins to help guide the clamping plate 116 during installation.

Unlike clamping plate 116, clamping plate 114 does not need a hold for the locating ring, but it does have a series of holes 170 and 172 that can be used for ejector pins to help remove the molded part from the first half of the mold base 112. The cut out 178 at the base of the clamping plate 114 is shown as a rectangle (but other shapes such as a triangular or circular are conceivable) sized to house a rectangular stop block 161. The cut out 178 may alternatively be shaped like the cut out 158 in clamping plate 116.

Figure 6:
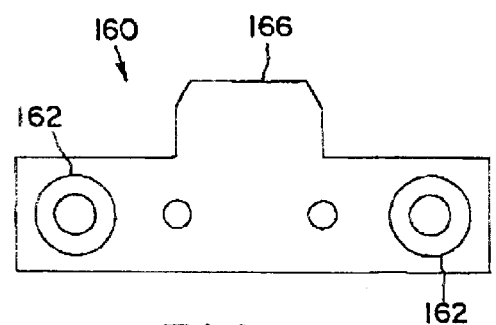
FIG. 6 is a front view of the stop block of FIG. 4.

FIG. 6 shows a preferred stop block 160 made in accordance with the present invention for clamping plate 116. The stop block 160 provides a positive stop that helps support the clamping plate in the vertical dimension. The stop block 160 comprises a plurality of counterbored holes 162 to allow the stop block 160 to be secured to the moveable platen 124. The stop block 160 further comprises an upstanding portion 166. The width of upstanding portion 166 is sized slightly smaller than the inside dimension of the upper portion of the cut out 158 in the clamping plate 116. The upstanding portion also helps guide the clamping plate 116 as it is being installed.

FIGS. 7A–7C show a preferred upper left support bracket 142. As can be seen, the support bracket 142 comprises a pair of wedge engagement surfaces 142A, 142B that form a corner type pocket 146 which functions a wedge receptacle. The angle of the wedge engagement surface 142B relative to the right hand edge of the support bracket 142 is preferably the same as acute angle theta θ (i.e. seven degrees) with the thicker portion towards the bottom of the support bracket 142. Also, the angle of the wedge engagement surface 142A relative to the rear surface of the support bracket 142 is also preferably the same as acute angle alpha α (i.e. seven degrees) with the thicker portion towards the bottom of the support bracket 142. Consequently, clamping plate wedge ramp surfaces 172A, 172B are preferably parallel with support bracket wedge engagement surfaces 142A, 142B, respectively. Support bracket 144 is a mirror image of support bracket 142.

FIGS. 8A–8C show a preferred lower left support bracket 143. As can be seen, the support bracket 143 comprises a pair of wedge engagement surfaces 143A, 143B that form a corner type pocket 147 which functions a wedge receptacle. The angle of the wedge engagement surface 143B relative to the right hand edge of the support bracket 143 is preferably the same as acute angle theta θ (i.e. seven degrees) with the thicker portion towards the bottom of the support bracket 143 and the angle of the wedge engagement surface 143A relative to the rear surface of the support bracket 143 is also preferably the same as acute angle alpha α (i.e. seven degrees) with the thicker portion towards the bottom of the support bracket 143. Consequently, clamping plate wedge ramp surface 173A, 173B are preferably parallel with support bracket wedge engagement surfaces 143A, 143B, respectively. Support bracket 145 is a mirror image of support bracket 143.

The wedges 172, 173, 174, 175 and support brackets 142, 143, 144, 145 located on the front and sides of the clamping plates 114, 116 allow for less a than perfect alignment of the mold assembly 100 relative to the injection-molding machine during installation by providing a lead-in that helps guide the clamping plates 114, 116 into the proper location. The wedges 172, 173, 174, 175 and wedge receptacles of the support brackets 142, 143, 144, 145 act to direct the mold towards the face and vertical center of a press platen during installation of the mold assembly 100 and to such that mold assembly 100 is located against and properly centered on the platens 122, 124. The wedges 172, 173, 174, 175 and wedge receptacles of the support brackets 142, 143, 144, 145 also allow the clamping plates 114, 116 and support brackets 142, 143, 144, 145 to releaseably engage one another whereby the mold assembly 100 may be inserted into the press and removed from the press without loosening the support brackets 142, 143, 144, 145.

A significant time savings is realized when the molding process using mold assembly 100 is complete and another mold assembly needs to be installed in the injection-molding machine. To remove the existing mold assembly 100, the installer uses a crane or forklift (if required) to hoist the mold assembly vertically upward and out of slideable engagement with the support brackets to thereby release the mold from the support brackets. The installer does not have to loosen any bolts. To install the new mold assembly, the installer simply lowers the new mold assembly into the injection-molding machine using a crane or forklift. This action directs the clamping plates 114, 116 into slideable engagement with the support brackets. The slidable engagement with the support brackets directs the mold assembly 100 towards the face and vertical center of the press platen. Specifically, the slideable engagement of clamping plate wedge ramp surfaces 172A, 173A, 174A, and 175A with support brackets engagement surfaces 142A, 143A, 144A, and 145A respectively directs the mold assembly 100 towards the face of the platens 122, 124. In addition, the slideable engagement of clamping plate wedge ramp surfaces 172B, 173B, 174B, and 175B with support bracket engagement surfaces 142B, 143B, 144B, and 145B respectively directs the mold assembly 100 towards the vertical center of the platens 122, 124. The installation of this second mold assembly may now only take 15–30 minutes where in the past it would have taken 1–4 hours.

It should be understood that, while the present invention has been described in detail herein, the invention can be embodied otherwise without departing from the principles thereof, and such other embodiments are meant to come within the scope of the present invention as defined in the following claim(s)

What is claimed is:

1. An apparatus for supporting a mold in a press, comprising:

a clamping plate comprising a wedge; and a support bracket comprising a wedge receptacle;

wherein the wedge and the wedge receptacle act to direct the mold towards the face and vertical center of a press platen.

2. The apparatus of claim 1 wherein the clamping plate and support bracket releaseably engage one another whereby the mold may be inserted into the press and removed from the press without loosening the support bracket.

3. The apparatus of claim 1, wherein the wedge comprises first and second wedge surfaces and the support bracket comprises first and second engagement surfaces and wherein the first wedge surface engages the first engagement surface and wherein the second wedge surface engages the second engagement surface.

4. The apparatus of claim 3 wherein the first wedge surface and the second wedge surface are adjacent.

5. The apparatus of claim 3 wherein the first wedge surface and the second wedge surface are orthogonal.

6. The apparatus of claim 3 wherein the first wedge surface and first engagement surface are parallel.

7. The apparatus of claim 3 wherein the first wedge surface forms an acute angle with a back surface of the clamping platen.

8. The apparatus of claim 3 wherein the second wedge surface forms an acute angle with a vertical center line of the clamping plate.

9. The apparatus of claim 1 wherein the clamping plate further comprises a second wedge and wherein the second wedge forms at least one double incline with the first wedge.

10. A method for installing a mold into a press comprising the steps of:

securing a plurality of support brackets to a platen of the press; and directing a portion of the mold into slideable t with the support brackets wherein the slidable engagement of at least one support bracket directs the mold towards the face and vertical center of the press platen.

11. The method of installing a mold into a press of claim 10 further comprising:

removing the mold from the press by directing a portion of the mold out of slideable engagement with to support brackets to thereby release the mold from the support brackets.

* * * * *